US006378976B1

(12) United States Patent
Byers et al.

(10) Patent No.: US 6,378,976 B1
(45) Date of Patent: Apr. 30, 2002

(54) USE OF AN ESSENTIALLY COLORLESS MARKER TO ALLOW EVALUATION OF NOZZLE HEALTH FOR PRINTING COLORLESS "FIXER" AGENTS IN MULTI-PART INK-JET IMAGES

(75) Inventors: Gary W. Byers, Vista; Shirley Lee, Poway, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/379,077

(22) Filed: Aug. 23, 1999

(51) Int. Cl.[7] .............................. B41J 2/17; G06K 7/10

(52) U.S. Cl. ............................ 347/19; 347/96; 347/98; 250/271; 250/458.1

(58) Field of Search .............................. 347/19, 43, 98, 347/96; 250/271, 458.1, 459.1, 461.1; 400/106

(56) References Cited

U.S. PATENT DOCUMENTS 5,083,814 A * 1/1992 Guinta et al. ................. 283/70
5,547,501 A * 8/1996 Maruyama et al. ....... 106/21 R
5,959,296 A * 9/1999 Cyr et al. ................... 250/271
5,980,016 A * 11/1999 Nelson et al. ................ 347/19

OTHER PUBLICATIONS

Hewlett–Packard Journal, vol. 36, No. 5, May 1985.
Hewlett–Packard Journal, vol. 39, No. 4, Aug. 1988.
Hewlett–Packard Journal, vol. 39, No. 5, Oct. 1988.
Hewlett–Packard Journal, vol. 43, No. 4, Aug. 1992.
Hewlett–Packard Journal, vol. 43, No. 6, Dec. 1992.
Hewlett–Packard Journal, vol. 45, No. 1, Feb. 1994.
W.J. Lloyd et al, "Output Hardcopy Devices", Academic Press, San Diego, Chapter 13, (1988).
Moser et al, "The Phthalocyanines", J. Phys. Soc. Jpn., vol. 1, pp 123–127 (1983).

* cited by examiner

*Primary Examiner*—Craig A. Hallacher

(57) ABSTRACT

A method and apparatus for a test pattern used in the alignment of an ink-jet pen which deposits fixer fluid, or other clear ink precursor fluid, or even colored ink fluid, on print media incorporates a colorless chemical marker in the fixer that is either infrared- or ultraviolet-sensitive and can either be observed using IR-sensitive detectors or visually, respectively, upon application of IR (or near-IR) radiation or UV radiation, respectively. Thus, data may be obtained with respect to deviations in a carriage-scan x-axis and a paper scan y-axis. Thus, the teachings of the present invention permit a determination of the extent of misdirected or missing nozzles.

9 Claims, 2 Drawing Sheets

USE OF AN ESSENTIALLY COLORLESS MARKER TO ALLOW EVALUATION OF NOZZLE HEALTH FOR PRINTING COLORLESS "FIXER" AGENTS IN MULTI-PART INK-JET IMAGES

TECHNICAL FIELD

The present invention relates generally to ink-jet printing technology methods and apparatus and, more specifically, to a method and apparatus for aligning ink-jet pens firing droplets of a colorless fluid.

BACKGROUND ART

The art of ink-jet technology is relatively well developed. Commercial products such as computer printers, graphics plotters, copiers, and facsimile machines employ ink-jet technology for producing hard copy. The basics of this technology are disclosed, for example, in various articles in the *Hewlett-Packard Journal*, Vol. 36, No. 5 (May 1985); Vol. 39, No. 4 (August 1988); Vol. 39, No. 5 (October 1988); Vol. 43, No. 4 (August 1992); Vol. 43, No. 6 (December 1992); and Vol. 45, No. 1 (February 1994) editions. Ink-jet devices are also described by W. J. Lloyd and H. T. Taub in *Output Hardcopy Devices*, chapter 13, R. C. Durbeck and S. Sherr, eds., Academic Press, San Diego (1988).

In U.S. Pat. No. 5,635,969, entitled "Method and Apparatus for the Application of Multipart Ink-Jet Ink Chemistry", issued to Allen and assigned to the common assignee of the present invention and incorporated herein by reference, a multi-color ink-jet printing system includes a printing element for apply a precisely metered quantity of a colorless precursor to a recording medium surface. The precursor conditions the medium surface prior to application of one or more colorants to the recording medium surface to prevent cockle and curl and to reduce dry time, while conditioning the recording medium surface for uniform dot gain independent of media composition. See also, e.g., U.S. patent application Ser. No. 09/069,717, entitled "Reactive Ink Set For Ink-Jet Printing", by Askeland et al, and U.S. patent application Ser. No. 09/069,616, entitled "Multi-Chamber Fluid Supply", by Askeland et al., and Related Applications cited therein which are also assigned to the common assignee of the present invention and are incorporated herein by reference. Hereinafter, colorless fluids used to affect ink dry time and permanence and to prevent cockle and curl of the print medium are generically referred to as "fixers."

In U.S. Pat. No. 5,600,350, entitled "Multiple Inkjet Print Cartridge Alignment by Scanning a Reference Pattern and Sampling Same with Reference to a Position Encoder", issued to Cobbs et al and assigned to the common assignee of the present invention and incorporated herein by reference, a method and apparatus for multiple ink-jet print cartridge alignment is provided by scanning a reference pattern and sampling with an optical sensor. In effect, a given test pattern is printed and actual print image data is compared to determine any misregistration of the cartridges. See also U.S. Pat. No. 5,796,414, entitled "A System and Method for Establishing Positional Accuracy in Two Dimensions Based on a Sensor Scan in One Dimension", issued to Sievert et al and assigned to the common assignee herein and incorporated by reference.

In such two-part ink-jet printing where the colorless "fixer" is used to help immobilize the colored or black ink, the "fixer" pen is expected to deposit the colorless fluid in a precise imagewise fashion. Misdirected or missing (misfiring or plugged) nozzles will produce an inferior image with inferior image uniformity and permanence. Since the fixer fluid deposited is colorless, the image is essentially invisible. Thus, it is difficult, if not impossible, to detect such misdirected or missing nozzles. Thus, there is a need for a method and apparatus for aligning an ink-jet print cartridge which prints a colorless fluid on the print medium for permitting detection of misdirected and/or missing nozzles.

DISCLOSURE OF INVENTION

In accordance with the present invention, by including a colorless or essentially colorless chemical marker in the fixer, then the fixer deposit can be evaluated. The chemical marker is essentially colorless in the visible electromagnetic spectrum, but is detectable under certain, specified conditions. For example, either ultraviolet light absorbing/visible light (blue) emitting markers or red (or infrared) light absorbing/infrared emitting markers may be used. The blue light emission can be observed visually or electronically using UV-sensitive cameras/sensors and the IR can be detected using IR-sensitive cameras/sensors. These markers would be useful any time nozzle health is of interest. The chemical marker can also be used in color (non-black) inks that do not strongly absorb in the IR region of chemical marker emission.

In its basic aspects, the present invention provides a method for determining status of nozzles in at least one ink-jet fluid writing instrument (fixer and/or colorant) mounted for printing on an adjacently positioned print medium and using a predetermined pattern of printing. The method comprises the steps of:

- mounting each ink-jet fluid writing instrument predetermined fixed positions relative to each other for printing pixels on the adjacently positioned print medium;
- mounting a sensor device in a predetermined fixed position relative to the ink-jet fluid writing instrument(s), the sensor device having a source for emitting electromagnetic radiation at a first wavelength range and having a detector for detecting electromagnetic radiation at a second wavelength range, both wavelength ranges in a pre-selected wavelength region from infrared to ultraviolet;
- providing a fluid in the ink-jet fluid writing instrument, the fluid containing an effective amount of a preselected chemical marker sufficient to be excited by the source at the first wavelength range to emit electromagnetic radiation at the second wavelength range that is detectable by the detector, the chemical marker and the sensor device both being operative over the same pre-selected wavelength region;
- printing a predetermined pattern in predetermined target areas on a blank print medium by firing from the ink-jet fluid writing instrument; and
- sensing the target area with the sensor device to obtain data representative of any misdirected or missing drops from the fluid.

In another basic aspect the present invention provides an apparatus for determining status of nozzles in a printhead of an ink-jet pen firing drops of a print liquid (fixer or colorant). The apparatus comprises:

- at least one printhead for printing a predetermined pattern on a region of the print medium, with the ink-jet pen firing drops of the print liquid; and
- a sensor device comprising a source portion for emitting electromagnetic radiation at a first wavelength range and a detector portion for detecting electromagnetic radiation at a second wavelength range, the sensor device operatively associated with a chemical marker contained in the liquid such that when the liquid is deposited on blank print medium, exposure of the chemical marker to the emitted electromagnetic radiation at the first wavelength range results in re-emission of the second wavelength range.

Other objects, features, and advantages of the present invention will become apparent upon consideration of the following explanation and the accompanying drawings, in which like reference designations represent like features throughout.

The drawings referred to in this specification should be understood as not being drawn to scale except if specifically noted.

BEST MODES FOR CARRYING OUT THE INVENTION

Reference is made now in detail to a specific embodiment of the present invention, which illustrates the best mode presently contemplated by the inventors for practicing the invention. Alternative embodiments are also briefly described as applicable.

Figure 1:
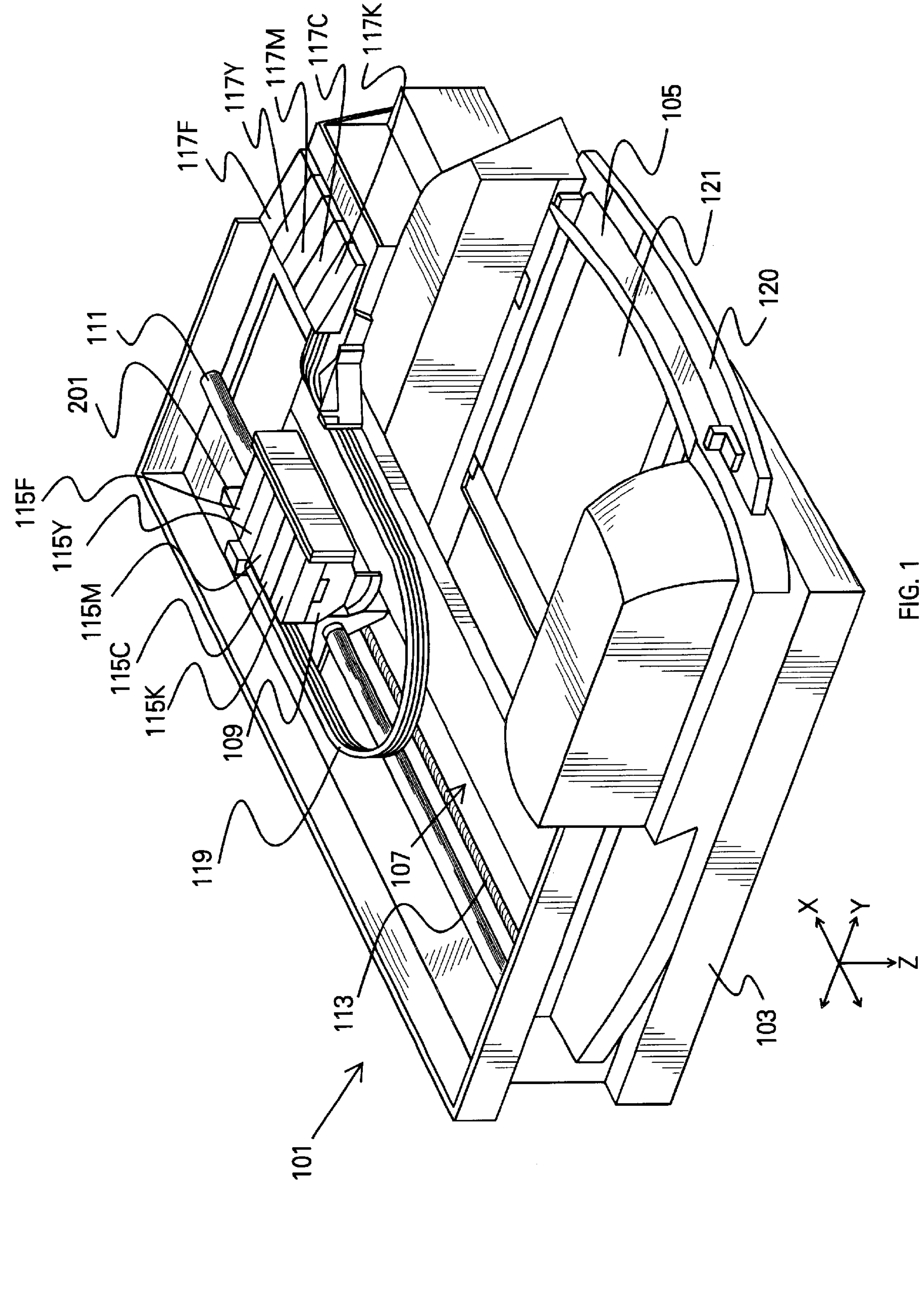
FIG. 1 is a perspective view of an ink-jet printer in accordance with the present invention.

FIG. 1 depicts an ink-jet hard copy apparatus, in this exemplary embodiment, a computer peripheral, color printer, 101. A housing 103 encloses the electrical and mechanical operating mechanisms of the printer 101. Operation is administrated by an internal electronic controller (usually a microprocessor or application-specific integrated circuit ("ASIC") controlled printed circuit board) connected by appropriate cabling (not shown) to the computer. It is well-known to program and execute imaging, printing, print media handling, control functions, and logic with firmware or software instructions for conventional or general purpose microprocessors or ASICs. Cut-sheet print medium 105—referred to generically hereinafter simply as "paper," regardless of actual medium selected by the end-user—is loaded by the end-user onto an input tray 120. Sheets of paper are then sequentially fed by a suitable, internal, paper-path transport mechanism (not shown) to an internal printing station platen, or "print zone," 107 where graphical images or alphanumeric text are created using state of the art color imaging and text rendering using dot matrix manipulation techniques. A carriage 109, mounted on a slider 111, scans the paper sheet delivered to the print zone 107. An encoder strip 113 and appurtenant position encoding devices on the carriage 109 and as part of the controller are provided for keeping track of the position of the carriage 109 at any given time (see, e.g., U.S. Pat. No. 4,789,874, entitled "Single Channel Encoder System", issued to Majette et al, and U.S. Pat. No. 4,786,803, entitled "Single Channel Encoder with Specific Scale Support Structure, issued to Majette et al, both assigned to the common assignee of the present invention and incorporated herein by reference).

A set of individual ink-jet writing instruments, or "pens", 115K, 115C, 115M, 115Y, 115F, each having ink-jet printheads as would be known in the art (not seen in this perspective), are releasably mounted in fixed positions on the carriage 109 for easy access and repair or replacement. Each printhead mechanisms is adapted for "jetting" minute droplets of ink or other fluids (see, e.g., Allen, supra) to form dots on adjacently positioned paper in the print zone 107. Refillable or replaceable ink supply cartridges, or "reservoirs", 117K, 117C, 117M, 117Y are provided; generally, in a full color ink-jet system, inks for the subtractive primary colors, cyan, yellow, magenta (CYM) and a true black (K) ink are used; note however that additive primary colors—red, blue, green—or other colorants can be used. In this set, a pen 115F and cartridge 117F for a colorless fluid fixer "F" is also provided. The pens 115 are coupled to respective cartridges by flexible tubing 119. Note also that the present invention can be implemented in hard copy apparatus employing self-contained supply, replaceable, ink-jet cartridges as are known in the art. Once a printed page is completed, the sheet of paper is ejected onto an output tray 121. It is common in the art to refer to the pen scanning direction as the x-axis, the paper feed direction as the y-axis, and the ink drop firing direction as the z-axis.

While four ink pens (CYMK) are shown, it will appreciated that the invention is not limited to the number of inks used. For example, a variation of the four pen CYMK print set is a six pen print set comprising light cyan, dark cyan, yellow, light magenta, dark magenta, and black. Such alternative variants may also be employed in the practice of the present invention.

Further, while one fixer (F) pen is shown, it will be appreciated that the invention is not limited to the number of fixer compositions used, nor the order of printing fixer and ink. For example, the fixer may be printed first, thereby forming an underprint, or the fixer may be printed last, thereby forming an over-print or over-coat, or one or more fixers may be both under-printed and over-printed. In this last instance, the fixer(s) may be the same or different in composition.

In accordance with the present invention, a small amount of an essentially visually colorless luminescent chemical marker is included in the fixer solution (F). The amount of the chemical marker is sufficient to be excited by a first wavelength emitted from a source of electromagnetic radiation and to itself emit electromagnetic radiation of a second wavelength. The first and second wavelengths are preselected to be in the range of infrared (IR) to ultraviolet (UV). However, the chemical marker, when used at the concentration levels necessary for the present invention, itself is substantially, if not totally, colorless in the visible region of the electromagnetic spectrum.

While excitation and emission are discussed above in terms of a first and second wavelength, respectively, it will be appreciated by those skilled in this art that in fact, a single wavelength is seldom attained, except perhaps for some lasers. Typically, especially when using filters, as discussed in greater detail below, for example, wavelength ranges or bands of varying widths are usually encountered.

The term "luminescence" is used herein to include both fluorescence (emission from a singlet excited state) and phosphorescence (emission from a triplet excited state).

The fluorescent marker can be a UV-absorbing fluorescent material, such as an optical brightener, which under UV illumination glows with visible light (usually blue). As an example, Blankophor P167 (Bayer Corp.) was used and permitted observation of individual nozzle traces upon illumination with UV light.

Similarly, a small amount of an IR-emitting chromophore may be employed in the practice of the present invention. As an example, Tinolux BBS (Ciba Specialty Chemicals), was used, which under red or IR light illumination emits in the IR. In this connection, an IR light sensor device may be used, such as Wizard V-6 Invisible mark viewer (V.L. Engineering Inc., Cincinnati Ohio), which permitted viewing individual images from individual nozzles.

The concentration of the chemical marker in the fixer must be sufficient such that upon stimulation or excitation by a source of electromagnetic radiation operating at a first wavelength range, then electromagnetic radiation of a second wavelength range is emitted by the chemical marker and is detectable by a suitable detector. However, the concentration of the chemical marker must be below that amount that would lead to self-quenching and thereby reduce the intensity of the second wavelength emitted. Simple experimentation will enable the person skilled in the art to determine the appropriate concentration range for a given chemical marker in a specific liquid environment.

Preferably, the concentration range of the UV/optical brightener is from about 0.001 to 3 wt %. The lower value is limited to detectability and is dependant upon use of a non-optically brightened substrate (contrast), the penetration by the marker into the substrate, and the sensitivity of the detection system. The upper value is limited by pen reliability/operability and self-quenching by some chromophores.

The IR markers used may have some red absorption, which makes them appear cyan at high concentrations. Thus, the lower value of concentration is similar to above, about 0.001 wt %, and dependent upon how well the marker fluoresces and how badly it penetrates into a porous/scattering substrate (reduces signal). The upper value of concentration is more dependent upon how much color one can tolerate and pen operability. For colorless fixers, about 0.007 wt % may be used, while in inks, a value of about 0.014% is starting to show some color contamination.

Also, Tinolux BBS is an aluminum phthalocyanine. Other metal phthalocyanines are also known to luminesce; see, e.g., "The Phthalocyanines", Vol. 1, Frank Moser and Arthur Thomas, CRC Press. Such other metal phthalocyanines, which are also usefully employed in the practice of the present invention, include zinc, cadmium, tin, magnesium, and europium.

Figure 2:
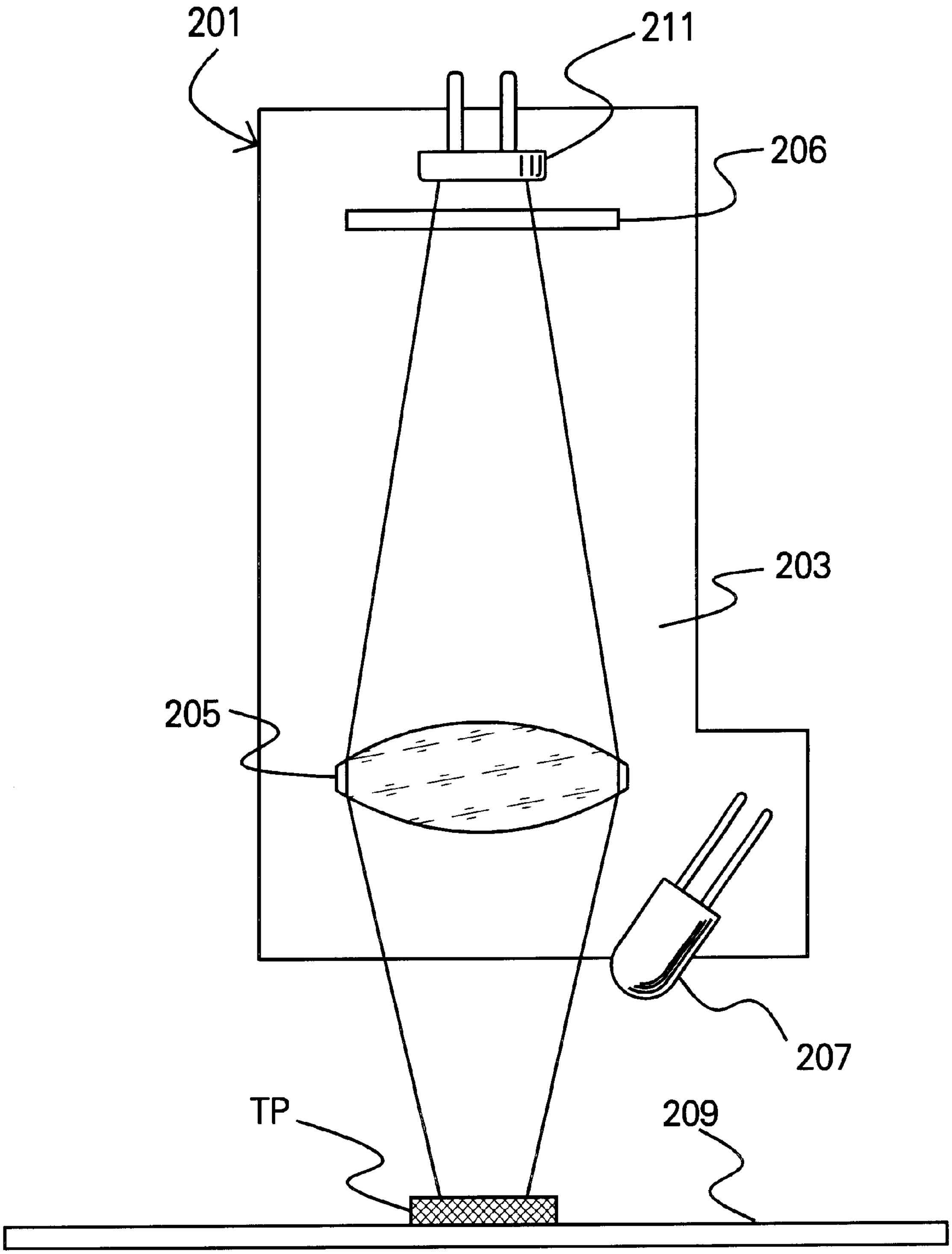
FIG. 2 is an optical sensor unit used in accordance with the present invention as shown in FIG. 1.

FIG. 2 is a schematic depiction of a sensor unit used in accordance with the present invention. Inkjet nozzles of the printheads are generally in-line with the sensor module 201 in the x-axis by mounting the module appropriately on the carriage 109 (FIG. 1). The sensor module 201 senses the location of fixer pen markings (with chemical marker) on the paper—namely ink dots or sets of ink dots—and provides electrical signals to the controller and the alignment algorithm, indicative of the registration of the portions of the printed pattern produced. An optical component holder 203 contains a lens 205 and a filter 206.

In the exemplary embodiment shown, one or more sources 207 of electromagnetic radiation of a first wavelength are mounted at an angle to the plane of the print zone 107 (FIG. 1). For example, the source(s) 207 may comprise light emitting diodes (LEDs) of the appropriate wavelength. As will be recognized by a person skilled in the art, it is also known in the art to use refraction and diffusion devices to align the light emitting and light sensitive components.

As mentioned above, the first wavelength emitted by the source(s) 207 actually has a bandwidth that depends on the source. While an LED may be used, the source 207 can also be a tungsten lamp or other metal lamp that is filtered.

The source(s) 207 projects electromagnetic radiation of the first wavelength range onto a test pattern "TP" printed with the printheads on the paper 209, and the electromagnetic radiation emitted at the second wavelength range by the chemical marker in the fixer is then detected by a detector 211. Known optical sensor and signal processing techniques are applied wherein the actual sensed pattern can be compared to the test pattern expected (see, e.g., Cobbs et al., supra). In this manner, misdirected droplets of fixer and/or missing nozzles on the fixer pen may be detected.

The detector 211 may be the eye of an observer, where the emitted electromagnetic radiation is in the visible region, such as the case when the chemical marker is activated by UV radiation and emits, e.g., blue light. Alternatively, the detector 211 may be a photodetector, set to detect the same wavelength or a narrow band around the wavelength of the emitted electromagnetic radiation.

The filter 206 is used to filter out stray electromagnetic radiation that might interfere with the detector 211. In particular, the filter may be set to filter out the wavelength of electromagnetic radiation emitted by the source 207.

Filtering the detector 211 for IR, in the case of an IR-emitting chemical marker, is described above. For safety, it should be mentioned that an observer should view a UV-illuminated sample through a UV-absorbing filter/glasses.

While the foregoing discussion has been presented in terms of providing a colorless chemical marker in the colorless fixer fluid, it will be apparent to those skilled in this art that, based on the teachings herein, the chemical marker may also be placed in one of the colored inks as well. Use of the chemical marker in one or more pens containing a colored ink will serve the same purposes as in the fixer fluid, namely, determining the status of the nozzles, as to whether the nozzles are misdirected or are plugged. Misdirected nozzles will show up as droplets of ink elsewhere on the paper than expected, while missing nozzles will show up as gaps in the pattern. Specifically, the use of the chemical marker in the colored inks allows automatic monitoring of the nozzle health with the same (or a reduced number of) detector/sensor elements and thus reduced complexity/expense. The use of a luminescing chemical marker can be used with most colored inks, other than black, so long as the absorption of the dye is not particularly strong in the region of the second wavelength emitted by the chemical marker.

EXAMPLES

The following formulations were prepared that contained either a UV luminescent material (Blankophor) or an IR-emitting material (Tinolux):

| Formulation #1 | |
|---|---|
| Blankophor P | 0.55 wt % (prepared using an 18% solution) |
| $Ca(NO_3)_2$ | 6 wt % |
| 2-pyrrolidone | 5 wt % |
| 1,5-pentanediol | 5 wt % |
| Dowfax 8390 | 1 wt % |
| Water-to make up 100 wt % | |
| pH adjusted to 4.0 using either $HNO_3$ (conc) or NaOH (50%). | |

| Formulation #2 | |
|---|---|
| Blankophor P167 | 0.5 wt % (prepare using an 1% solution) |
| $Ca(NO_3)_2$ | 6 wt % |
| 2-pyrrolidone | 5 wt % |
| 1,5-pentanediol | 5 wt % |
| Dowfax 8390 | 1 wt % |
| Water-to make up to 100% | |
| pH adjusted to 4.0 using either | |
| $HNO_3$ (conc) or NaOH (50%). | |

| Formulation #3 | |
|---|---|
| Tinolux BBS | 0.007 wt % (prepared using a 14% solution) |
| $Ca(NO_3)_2$ | 6 wt % |
| 2-pyrrolidone | 5 wt % |
| 1,5-pentanediol | 5 wt % |
| Dowfax 8390 | 1 wt % |
| Water-to make up to 100% | |
| pH adjusted to 4.0 using either | |
| $HNO_3$ (conc) or NaOH (50%). | |

| Formulation #4 | |
|---|---|
| Blankophor P167 | 0.5 wt % (solid added to ink) |
| DesignJet CP Ink System cyan ink-to make up to 100% (Cyan HP part No. C1893). | |

| Formulation #5 | |
|---|---|
| Tinolux BBS | 0.014 wt % (100 microliters 14% solution in 100 ml ink) |
| DesignJet CP Ink System cyan ink-to make up to 100% (Cyan HP part No. C1893). | |

| Formulation #6 | |
|---|---|
| Tinolux BBS | 0.014 wt % (100 microliters 14% solution in 100 ml ink) |
| DesignJet CP Ink System magenta ink-to make up to 100% (Magenta HP part No. C1894). | |

| Formulation #7 | |
|---|---|
| Tinolux BBS | 0.014 wt % (100 microliters 14% solution in 100 ml ink) |
| DesignJet CP Ink System yellow ink-to make up to 100% Yellow HP part No. C1895). | |

The above-listed formulations that were used with color inks employed Hewlett-Packard's commercial large format DesignJet ink system; the appropriate stock numbers for the retail kits are given. As one might expect, the IR marker (Tinolux BBS) was visible, but attenuated in signal in the cyan ink. The UV/optical brightener (Blankophor P167) used in Formulation #4 (cyan ink) produced a very strong and easily visible signal, when imaged on a paper containing little or no optical brightener (Steinbeis/Zweckform Recyconomic).

Nozzle test files were printed with formulations #4 to #7. As expected, Formulations #6 and #7 gave strong and easily observable IR images, while Formulation #5 (cyan ink) gave an attenuated image. However, when the marker for the cyan was changed to a UV-absorbing optical brightener (Formula #4), the visual image was very strong.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents.

What is claimed is:

1. A method for determining nozzle status of at least one ink-jet fluid writing instrument wherein said writing instrument contains a colorless fixer fluid and is mounted for printing on an adjacently positioned print medium, using a predetermined pattern of printing, either before or after, or both, printing at least one colored ink fluid using said predetermined pattern of printing and wherein said colorless fixer fluid is used in conjunction with said at least one colored ink to improve at least one printed property thereof, said method comprising the steps of:

mounting each ink-jet fluid writing instrument in predetermined fixed positions relative to each other for printing pixels on said adjacently positioned print medium;

mounting a sensor device in a predetermined fixed position relative to said at least one ink-jet fluid writing instrument, said sensor device having an emitter for emitting electromagnetic radiation at a first wavelength range and having a detector for detecting electromagnetic radiation at a second wavelength range, both wavelengths in a pre-selected wavelength region from infrared to ultraviolet;

mounting a filter between said printed print medium and said detector portion for filtering out said electromagnetic radiation at said first wavelength range;

providing a colorless print fixer fluid in a said ink-jet fluid writing instrument, said colorless print fixer fluid containing an effective amount of a pre-selected chemical marker sufficient to be excited by said source at said first wavelength range to emit electromagnetic radiation at said second wavelength range that is detectable by said detector, said chemical marker and said sensor device both being operative over the same pre-selected wavelength region;

printing a predetermined test pattern in predetermined target areas on a blank print medium by firing from said at least one writing instrument containing said colorless print fixer fluid; and sensing said target areas with said sensor device to obtain data representative of any misdirected or missing drops from said print fixer fluid.

2. The method of claim 1, wherein said step of printing a predetermined pattern in predetermined target areas on a blank print medium by firing from one writing instrument further comprises:

depositing fluid droplets from said ink-jet fluid writing instrument.

3. The method of claim 1, wherein said chemical marker comprises a UV absorbing fluorescent material, which, under illumination glows with visible light.

4. The method of claim 1, wherein said chemical marker comprises an IR-emitting chromophore, which under red (or IR) light illumination emits in said IR.

5. An apparatus for determining nozzle status of at least one printhead of an ink-jet pen firing drops of a colorless print fixer fluid onto a print medium, comprising:

a sensor device comprising an emitter portion for emitting electromagnetic radiation at a first wavelength range and a detector portion for detecting electromagnetic radiation at a second wavelength range, said sensor device operatively associated with a chemical marker contained in said print fixer fluid such that when said print fixer fluid is deposited on blank print medium, exposure of said chemical marker to said emitted electromagnetic radiation at said first wavelength range results in re-emission of electromagnetic radiation at said second wavelength range;

a filter between said printed print medium and said detector portion for filtering out said electromagnetic radiation at said first wavelength range;

at least one printhead for printing a predetermined pattern on an area of said print medium with at least one ink-jet pen firing drops of a colored print fluid;

at least one printhead for printing said predetermined pattern on said area of said print medium with at least one said ink-jet pen firing drops of said colorless print fixer fluid, either before or after, or both, printing said colored print fixer fluid; and a mechanism for printing a test pattern of said colorless print fixer fluid on said print medium, said test pattern operatively associated with said sensor device.

6. The apparatus of claim 5, further including a mounting wherein said at least one ink-jet pen is fixedly mounted and both said at least one ink-jet pen and said sensor device are fixedly aligned in a predetermined relationship to each other.

7. The apparatus of claim 6, comprising:

said mounting is a scanning carriage for carrying said at least one ink-jet pen across predetermined swath positions of said print medium.

8. The apparatus of claim 6, wherein said chemical marker comprises a UV absorbing fluorescent material, which, under illumination glows with visible light.

9. The apparatus of claim 6, wherein said chemical marker comprises an IR-emitting chromophore, which under red (or IR) light illumination emits in said IR.

* * * * *